US007609025B2

(12) United States Patent
Griffin

(10) Patent No.: US 7,609,025 B2
(45) Date of Patent: Oct. 27, 2009

(54) KIT OF POWER TOOLS

(75) Inventor: Paul W. Griffin, Kanosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 170 days.

(21) Appl. No.: 11/592,874

(22) Filed: Nov. 3, 2006

(65) Prior Publication Data
US 2008/0122403 A1 May 29, 2008

(51) Int. Cl.
H02J 7/00 (2006.01)
(52) U.S. Cl. .................. 320/112; 320/113; 320/115; 361/614; 310/50; 439/500
(58) Field of Classification Search .......... 320/112, 320/113, 115; 361/614; 81/52; 483/13; 310/50; 439/500
See application file for complete search history.

(56) References Cited

U.S. PATENT DOCUMENTS

| 4,050,003 | A | * | 9/1977 | Owings et al. ........... 320/113 |
| 4,641,076 | A | * | 2/1987 | Linden .................. 320/113 |
| 4,739,242 | A | * | 4/1988 | McCarty et al. .......... 320/110 |
| 5,187,422 | A |   | 2/1993 | Izenbaard |
| 6,181,032 | B1 | * | 1/2001 | Marshall et al. .......... 307/150 |
| 6,204,632 | B1 | * | 3/2001 | Nierescher et al. ........ 320/116 |
| 6,296,065 | B1 |   | 10/2001 | Carrier |
| 6,350,149 | B1 |   | 2/2002 | Nakane |
| 6,502,949 | B1 |   | 1/2003 | Horiyama |
| 6,653,815 | B2 | * | 11/2003 | Watson et al. ............ 320/114 |
| 6,727,679 | B2 |   | 4/2004 | Kovarik |
| 6,921,285 | B2 |   | 7/2005 | Glauning |
| 2005/0077873 | A1 |   | 4/2005 | Watson |
| 2006/0071634 | A1 | * | 4/2006 | Meyer et al. ............ 320/112 |
| 2006/0096771 | A1 | * | 5/2006 | Brotto ................. 173/217 |
| 2006/0254044 | A1 | * | 11/2006 | Hao .................... 29/560 |

* cited by examiner

Primary Examiner—Edward Tso
Assistant Examiner—Arun Williams
(74) Attorney, Agent, or Firm—Barnes & Thornburg LLP

(57) ABSTRACT

A kit comprising a plurality of power tools configured to operate at different voltages, a plurality of receivers configured to provide different output charging voltages and means for selectively engaging each receiver with only one or more power tools having an operating voltage equal to or greater than the output charging voltage of the receiver to charge the one or more power tool. The selective engagement means being in the form of a plurality of terminal block. Each terminal block may be secured to a respective one of the power tools. Each terminal block may include a rib and each receiver may define a slot to receivingly engage one of the ribs. The rib of each terminal block may be disposed at a different location than the ribs of the other terminal blocks, and the slot of each receiver may be positioned at a different location than the slots of the other receivers. Some of the receivers may engage more than one of the terminal blocks so that the receivers may engage the power tools that operate at the same or greater voltages than the charging voltage of the receivers.

18 Claims, 6 Drawing Sheets

KIT OF POWER TOOLS

BACKGROUND

This disclosure relates generally to power tools and more specifically to a kit that includes power tools that operate at different voltages.

In the power tool field, it is common to use different types of power tools to address the varied needs of the user of the power tools. It is also common to use power tools that operate at different voltages also to address the varied needs of the user. The need to use different types of power tools and/or power tools of different voltages typically cause manufacturing, costs, storage and charging issues.

SUMMARY

The present disclosure relates to a kit comprising a plurality of power tools, each configured to operate at a different voltage; a plurality of receivers, each configured to provide a different output charging voltage; and means for selectively engaging each receiver with only the one or more of the power tools having an operating voltage equal to or greater than the output charging voltage of the receiver to charge the one or more power tool. The selective engagement means may be in the form of a plurality of terminal blocks or any other form. Each terminal block may include a rib and each receiver may define a slot to receivingly engage one of the ribs. The position of the rib of each terminal block may depend upon the operating voltage of the power tool to which it is secured, and the position of the slot of each receiver may depend upon the output charging voltage of the receiver. Some of the receivers may engage more than one of the terminal blocks so that the receivers may selectively engage the power tools that operate at the same or greater voltages than the output charging voltage of the receivers.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
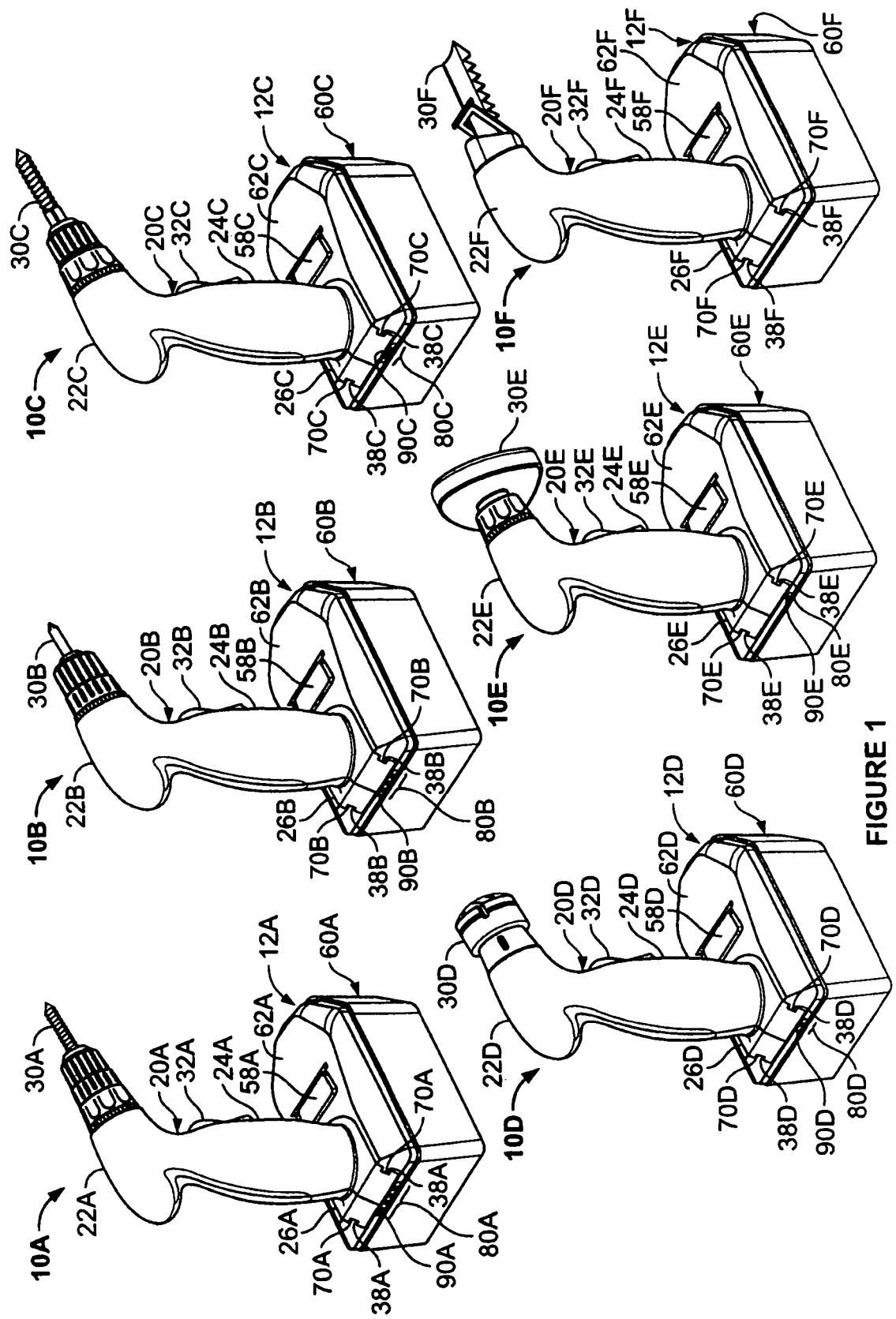
FIG. 1 is a perspective view of a plurality of power tools, a plurality of receivers engaged with the power tools to charge the power tool, and a plurality of terminal blocks electrically connecting the power tools and the receivers, including a power drill tool configured to operate at 9.6 volts engaged with a corresponding receiver configured to provide a charging output of 9.6 volts, a power screwdriver tool configured to operate at 12 volts engaged with a corresponding receiver configured to provide a charging output of 12 volts, a power drill tool configured to operate at 14 volts engaged with a corresponding receiver configured to provide a charging output of 14 volts, a power flashlight tool configured to operate at 18 volts engaged with a corresponding receiver configured to provide a charging output of 18 volts, a power sander tool configured to operate at 20 volts engaged with a corresponding receiver configured to provide a charging output of 20 volts, and a power reciprocating saw tool configured to operate at 24 volts engaged with a corresponding receiver configured to provide a charging output of 24 volts.

While the present disclosure may be susceptible to embodiment in different forms, there is shown in the drawings, and herein will be described in detail, an embodiment with the understanding that the present description is to be considered an exemplification of the principles of the disclosure and is not intended to limit the disclosure to the details of construction, methods and the arrangements of components set forth in the following description or illustrated in the drawings.

FIGS. 1-5 illustrate a plurality of power tools 10A-10F, a plurality of receivers 12A-12F, and a plurality of terminal blocks 14A-14F in accordance with an embodiment of the present disclosure. The power tools 10A-10F are in the form of a power drill 10A, a power screwdriver 10B, another power drill 10C, a power flashlight 10D, a power sander 10E, and a power reciprocating saw 10F. The types of power tools 10A-10F included in the illustrated embodiment are merely exemplary, and may, in accordance with other embodiments, be any other suitable type, combination and construction.

Each of the terminal blocks 14A-14F is secured to or otherwise associated with a corresponding one of the power tools 10A-10F and electrically connects a respective and one of the power tools 10A-10F with one of the receivers 12A-12F. Each of the receivers 12A-12F includes a battery pack or any other suitable power source. In accordance with the present disclosure, the power tools 10A-10F, receivers 12A-12F and terminal blocks 14A-14F can be in any suitable number and have any suitable construction and the terminal blocks can be omitted or can have substantially different constructions depending upon the construction of the power tools and receivers.

Figure 2:
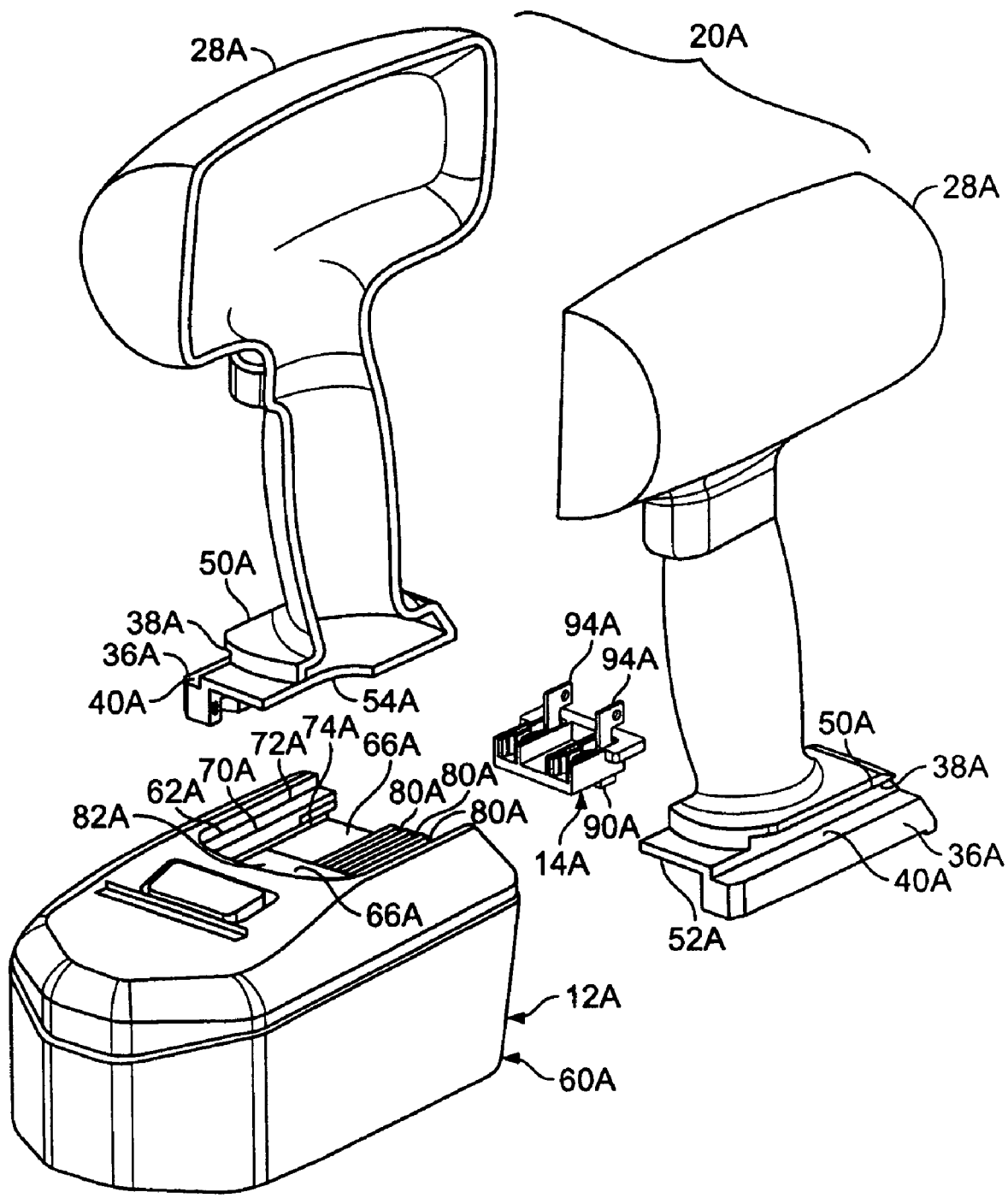
FIG. 2 is an exploded perspective view of a representative housing of one of the power tools and one of the receivers and terminal blocks of FIG. 1, illustrating the shells of the representative housing separated from each other and the terminal block associated with one of the power tools.
Figure 3:
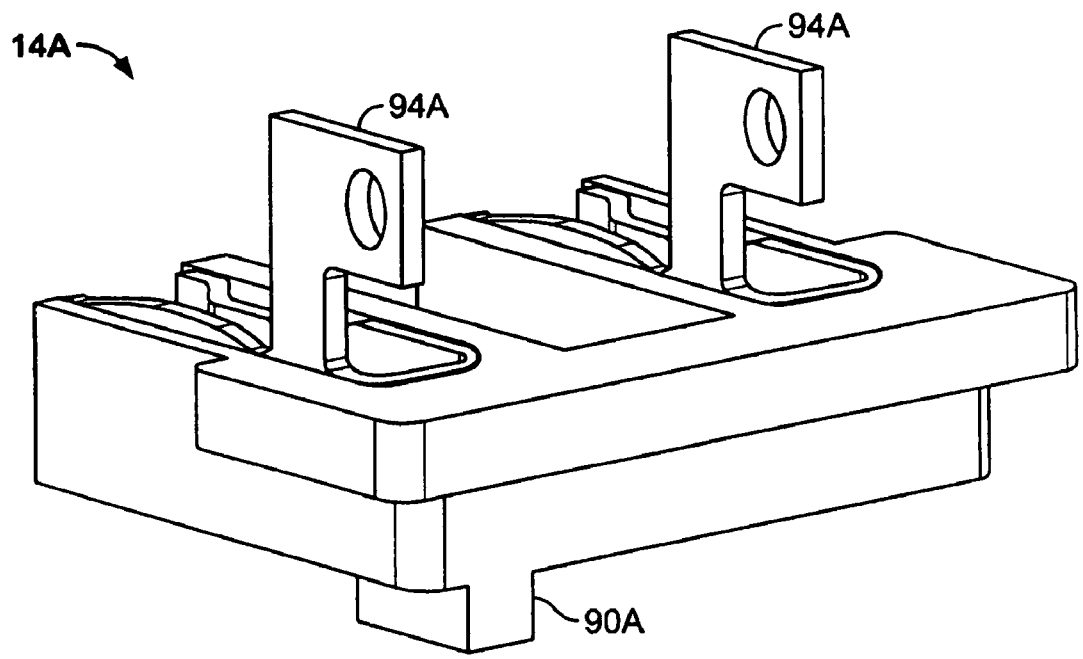
FIG. 3 is a perspective view of one of the terminal blocks associated with one of the power tools of FIG. 1.
Figure 4:
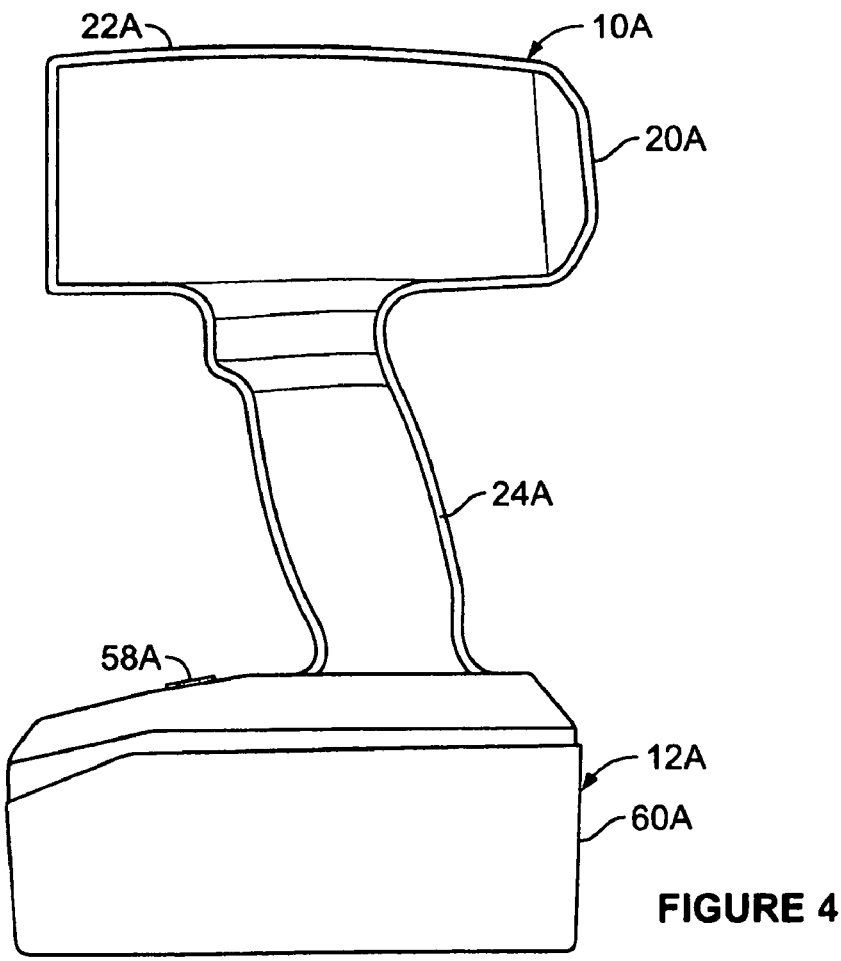
FIG. 4 is a side plan view of one of the power tools engaged with the corresponding receiver of FIG. 1.

In the illustrated embodiment, the power tools 10A-10F comprise power tool housings 20A-20F of substantially similar, if not identical, construction. With reference to FIG. 2, which illustrates a representative sample of each of the power tool housings 20A-20F, each power tool housing 20A-20F includes a working portion 22A-22F, a handle portion 24A-24F, and a base 26A-26F, and may comprise two complementary shells 28A-28F fitted or otherwise engaged together. Each of the power tools 10A-10F includes respective power tool elements corresponding to the type of power tool including working elements such as, for example, a drill bit 30A, a screwdriver 30B, a drill bit 30C, a sander 30D, a flashlight 30E, and a saw 30F, and also includes any suitable hardware and electronics to operate the tool elements. The tool elements and the hardware, and electronics may be contained partly or entirely within the power tool housing 20A-20F or may otherwise be associated with the power tool housing.

Each of the power tools 10A-10F may operate at different voltages. For example, the power tool 10A is configured to operate at 9.6 volts, the power tool 10B is configured to operate at 12 volts, the power tool 10C is configured to operate at 14.4 volts, the power tool 10D is configured to operate at 18 volts, the power tool 10E is configured to operate at 20 volts, and/or the power tool 10F is operated at 24 volts. The power tools 10A-10F may operate at any other voltages, including any other combination of voltages, in accordance with other embodiments. Each of the power tools includes an on-off switch 32A-32F.

The base 26A-26F of each power tool housing 20A-20F defines on opposed sides 36A-36F a pair of slots 38A-38F extending along most of the length of the base. The slots 38A-38F are defined by a pair of ridges 40A-40F extending along the entire length of the side 36A-36F of the base 26A-26F and by a pair of outwardly extending rails 50A-50F extending along most of the length of the base. The front of the base defines a U-shaped opening 52A-52F and the bottom of the base defines a void 54A-54F contiguous with the U-shaped opening for receiving a corresponding one of the terminal blocks 14A-14F.

The receivers 12A-12F comprise receiver housings 60A-60F of substantially similar, if not identical, construction. Each of the receivers 12A-12F is configured to engage and charge the one or more of the power tools 10A-10F that have an operating voltage equal to or greater in magnitude than the output charging voltage of the receiver. Accordingly, each of the receivers 12A-12F also includes the battery pack or any other suitable power source and any suitable hardware and electronic components to provide power from the battery pack or other power source to the one or more power tool 10A-10F. The battery packs may be contained within the receiver housings 60A-60F or be otherwise associated with the receivers 12A-12F.

The receivers 12A-12F may each provide different output charging voltages for charging the one or more of the power tools 10A-10F. For example, the receiver 12A provides an output charging voltage of 9.6 volts, the receiver 12B provides an output charging voltage of 12 volts, the receiver 12C provides an output charging voltage of 14.4 volts, the receiver 12D provides an output charging voltage of 18 volts, the receiver 12E provides an output charging voltage of 20 volts, and the receiver 12F provides an output charging voltage of 24 volts. The receivers 12A-12F may provide any other output charging voltages, including any other combination of voltages, in accordance with other embodiments. Each receiver includes a power switch 58A-58F.

Each receiver housing 60A-60F includes a top portion 62A-62F that defines a rear U-shaped opening 64A-64F and a void 66A-66F contiguous with the U-shaped opening. The top portion 62A-62F of each receiver housing 60A-60F also includes a pair of inwardly-extending rails 70A-70F that each define upper and lower slots 72A-72F and 74A-74F separated by the rail 70A-70F. The upper and lower slots 72A-72F and 74A-74F of each receiver housing are contiguous with the void 66A-66F. The receiver housing 60A-60F is configured to be slidably engageable with each of the power tool housings 20A-20F such that the pair of rails 70A-70F of the receiver housing 60A-60F are slidably received by the pair of slots 38A-38F defined by the base 26A-26F of the power tool, such that the rails 50A-50F of the power tool housings are received by the upper slots 72A-72F of the receiver housings, and such that the ridges 40A-40F of the base of the power tool are slidably received by the lower slots 74A-74F of the receiver of the housing. Thus, each of the power tool housings 20A-20F is slidably engageable with each of the receiver housings 60A-60F, except that the present disclosure further includes means for selectively engaging with each receiver 12A-12F and charging one or more power tools 10A-10F that operate at a voltage equal to or greater than the output charging voltage of the receiver.

Accordingly, in the illustrated embodiment, all of the power tool housings 20A-20F are of identical or substantially identical construction and all of the receiver housings 60A-60F are of identical or substantially identical construction. Thus, in the illustrated embodiment, all of the power tool housings 20A-20F are slidably engageable with all of the receiver housings 60A-60F by virtue of the above-described engaging structure at the base 26A-26F of the power tool housings and the top portion 62A-62F of the receiver housings. As a result, the kit in accordance with the illustrated embodiment of the present disclosure may be easier and less expensive to manufacture and may also provide other use and storage advantages over other kits or assemblies of power tools of different types and voltages and receivers or other charging structures.

Notwithstanding that in the illustrated embodiment all of the power tool housings 20A-20F are configured to engage all of the receiver housings 60A-60F, the present disclosure further includes the means for selectively engaging each receiver 12A-12F and charging only the one or more power tools 10A-10F that operate at a voltage equal to or greater to the output charging voltage of the receiver 12A-12F. Such engaging and charging means may be in any suitable form. In the illustrated embodiment, for example, the engaging and charging means comprises the terminal blocks 14A-14F and slots 80A-80E defined by the receiver housings 60A-60E, and the above-described engaging structure of the base 26A-26F of the power tool housings 20A-20F and the top 62A-62F of the receiver housing 60A-60F. The engaging and charging means may further include a contact plate 82A-82F which may incorporate any suitable structure for contacting the terminal blocks 14A-14E. Each of the terminal blocks 14A-14F is associated with one of the power tools 10A-10F. Each terminal block 14A-14F is received by the void 54A-54F of the base of the corresponding power tool 10A-10F and is secured to the base in any suitable manner.

The terminal blocks 14A-14F and slots 80A-80F are configured such that each terminal block is engageable with and can charge only the one or more receivers 12A-12F having an output charging voltage equal to or less than the operating voltage of the power tool 10A-10F to which the terminal block is secured. Each terminal block 14A-14E includes a bottom rib 90A-90E receivable in one or more of the slots of one or more corresponding receivers 12A-12E to engage one or more receivers, but the position of the rib of each terminal block depends upon the operating voltage of the power tool 10A-10E to which the terminal block is secured. The terminal block 14F does not include any ribs 90 and the receiver housing 60F does not include any of the slots 80, so that the power tool 10F is engageable with all of the receivers 12A-12F but the receiver 12F is not engageable with any of the power tools 10A-10E. Each terminal block 14A-14F further includes contacts 94A-94F.

The positions of the slots 80A-80F on the receivers 12A-12F depend upon the voltage provided by the receiver. Additionally, the receivers 14A-14D may have more than one slot so that the receivers also engage power tools having operating voltages greater than the output charging voltage of the receiver. Thus, in the illustrated embodiment, the terminal block 14A-14F associated with each power tool 10A-10F engages only the receivers 14A-14F having output charging voltages that equal or are less than the operating voltage of the power tool, and, as a result, each power tool engages and can be charged by only the receivers having output charging voltages that equal or are less than the operating voltage of the power tool.

FIGS. 5A-5F provide examples of locations of the ribs 90A-90E of the respective terminal blocks 14A-14E and locations of the slots 80A-80E of the respective receivers 12A-

Figure 5A:
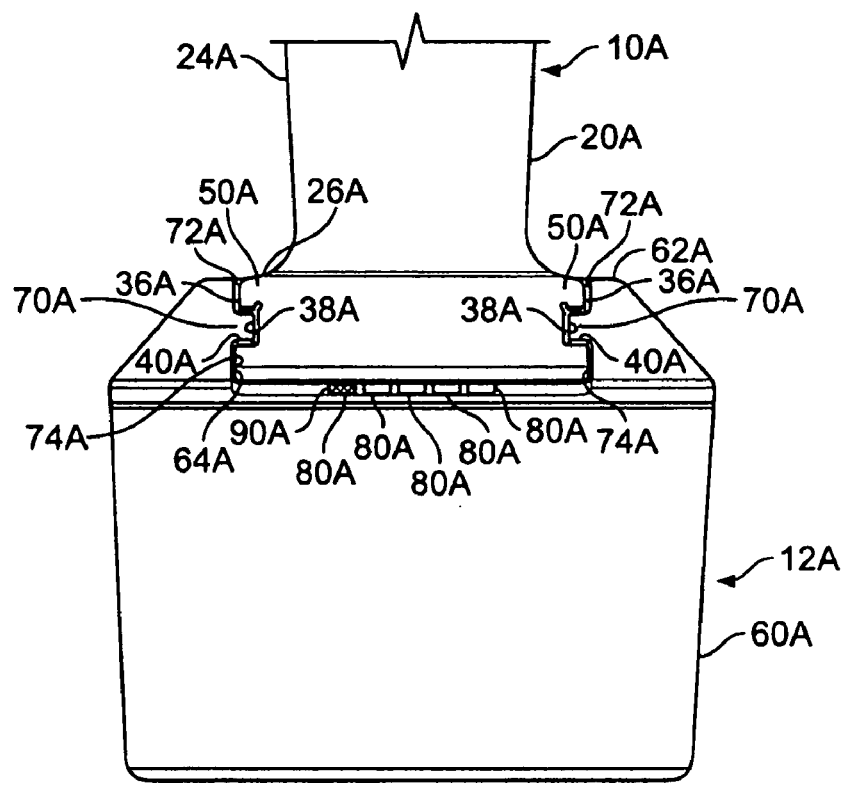
FIG. 5A-5F are broken rear plan views illustrating each of the power tools of FIG. 1 engaged with its corresponding receiver of FIG. 1.

12E illustrated in FIG. 1. FIG. 5A shows the 9.6V power tool 10A engaged with and being charged by the receiver 12A, which includes a 9.6V battery pack, and also shows the positions of the rib 90A corresponding to the power tool 10A and one of the slots 80 of the receiver 12A receiving the rib 90A. The receiver 12A includes other slots 80A and, thus, is also engageable with and can charge the other power tools 10B-10F.

Figure 5B:
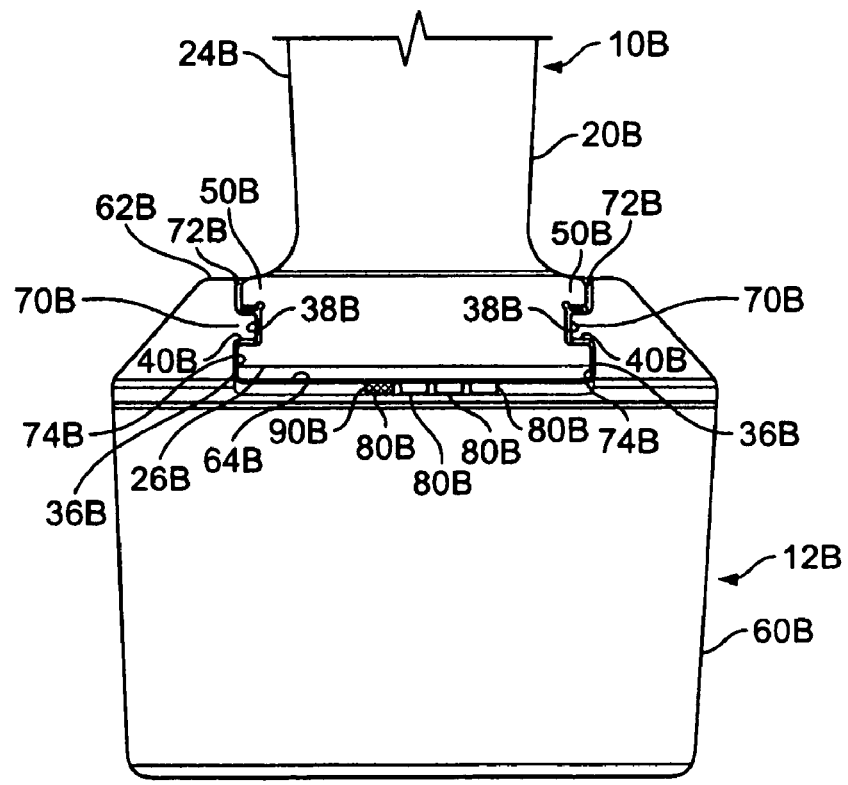

FIG. 5B shows the 12V power tool 10B engaged with and being charged by the receiver 12B, which includes a 12V battery pack, and also shows the positions of the rib 90B associated with the power tool 11B and one of the slots 80B of the receiver 12B receiving the rib 90B. The receiver 12B includes other slots 80B and, thus, is also engageable with and can charge the other power tools 10C-10F. The receiver 12B is not engageable with the power tool 10A because the operating voltage of the power tool 10A is less than the output charging voltage of the receiver 10B.

Figure 5C:
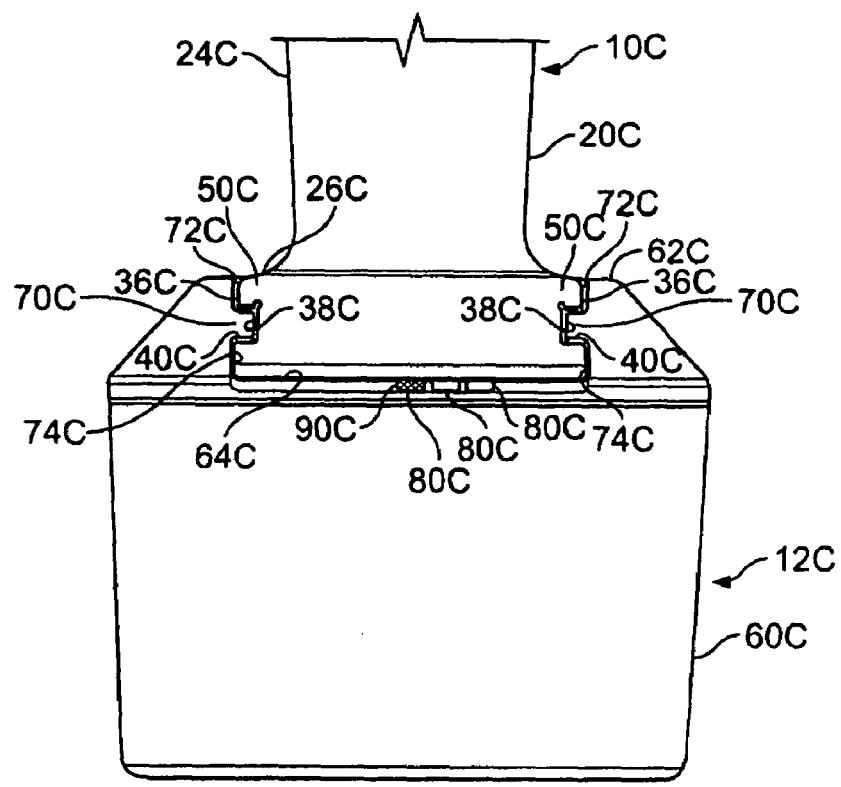

FIG. 5C shows the 14V power tool 10C engaged with and being charged by the receiver 12C, which includes a 14V battery pack, and also shows the positions of the rib 90C associated with the power tool 10C and one of the slots 80C of the receiver 12C receiving the rib 90C. The receiver 12C includes other slots 80C and, thus, is also engageable with and can charge the other power tools 10D-10F. The receiver 12C is not engageable with the power tools 10A-10B.

Figure 5D:
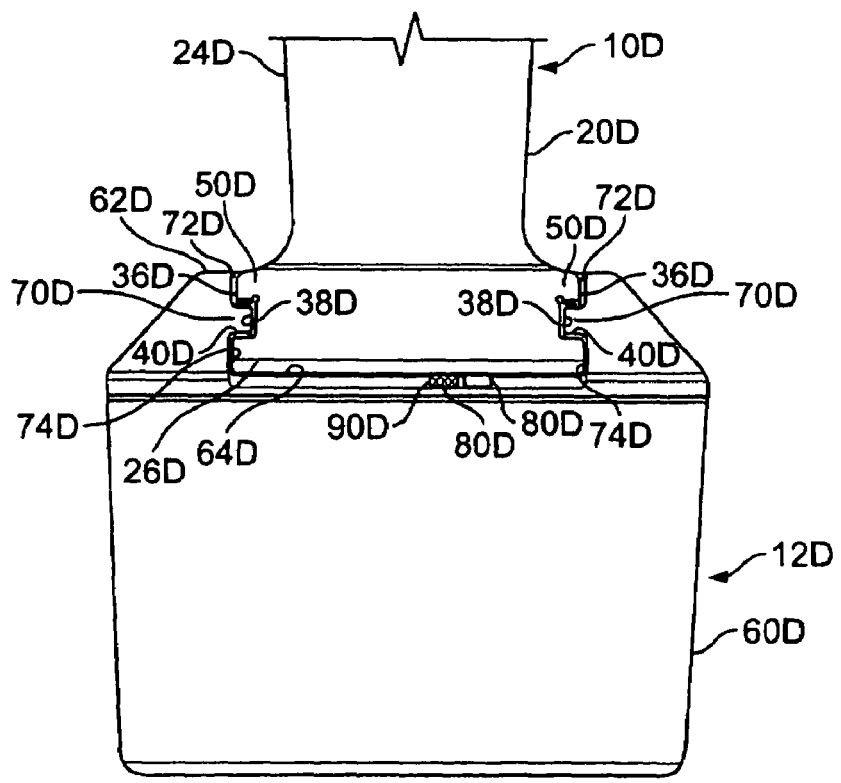

FIG. 5D shows the 18V power tool 10D engaged with and being charged by the receiver 12D, which includes a 18V battery pack, and also shows the positions of the rib 90D associated with the power tool 10D and one of the slots 80D of the receiver 12D receiving the rib 90D. The receiver 12D includes other slots 80D and, thus, is also engageable and can charge the other power tools 10E-10F. The receiver 12D is not engageable with the power tools 10A-10C because those power tools have an operating voltage less than the output charging voltage of the receiver 12D.

Figure 5E:
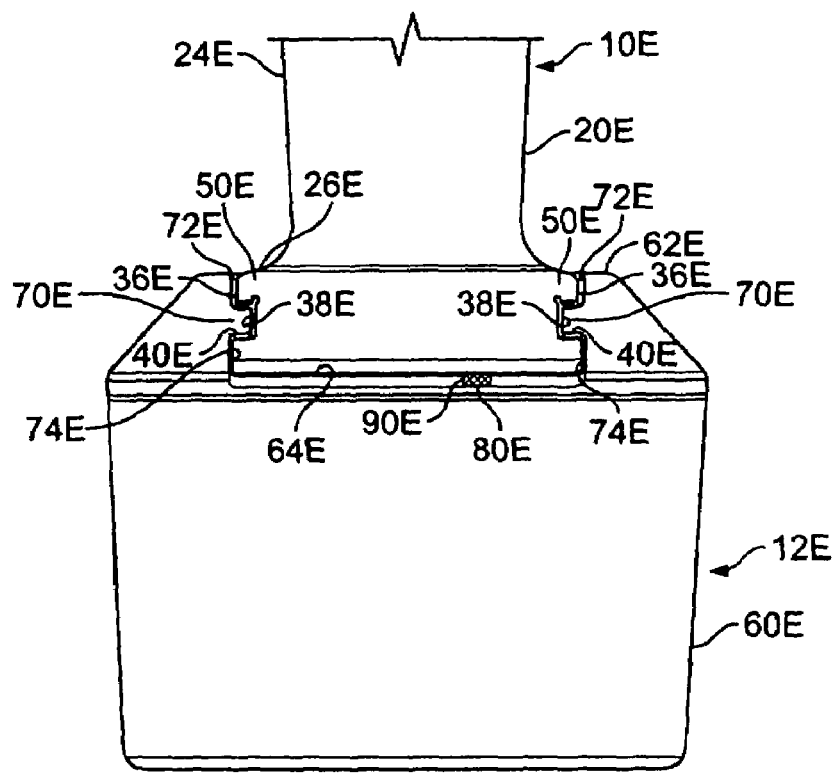

FIG. 5E shows the 20V power tool 10E engaged with and being charged by the receiver 12E, which includes a 20V battery pack, and also shows the positions of the rib 90E associated with the power tool 10E and the slot 80E of the receiver 12E receiving the rib 90E. The receiver 12E is also engageable and can charge the other power tool 10F. The receiver 12E is not engageable with the power tools 10A-10D because those power tools have an operating voltage less than the output charging voltage of the receiver 12E.

Figure 5F:
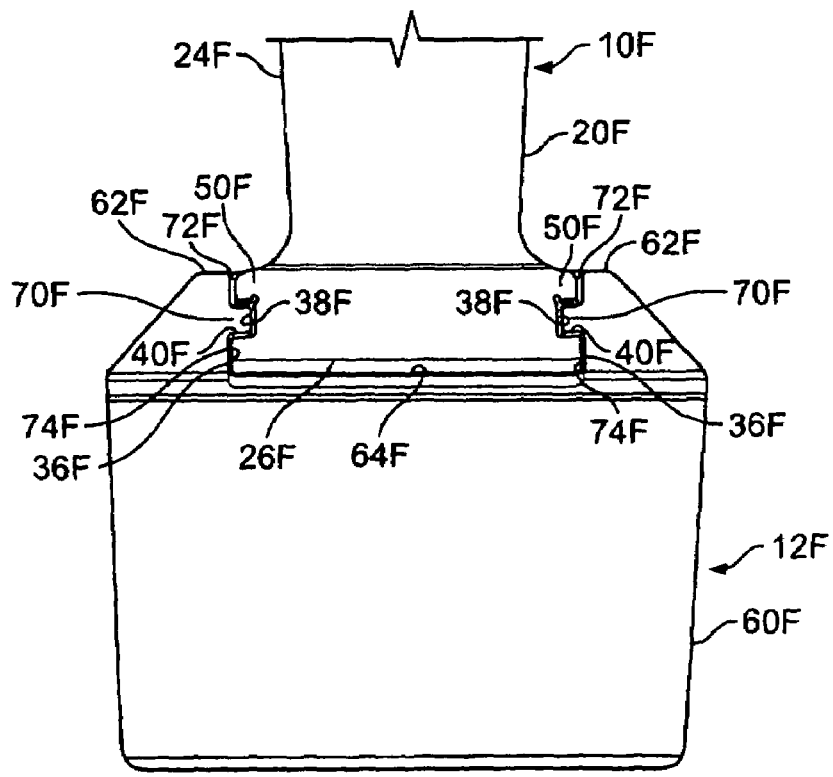

FIG. 5F shows the 24V power tool 10F engaged with and being charged by the receiver 12F, which includes a 14V battery pack. The power tool 10F does not include any ribs 90 and thus is engageable with all of the other receivers 12A-12E because those other receivers have an output charging voltage less than the operating voltage of the tool. The receiver 12F does not include any slots 90.

Accordingly, means are provided for selectively engaging each of the receivers 12A-12F with the one or more power tools 10A-10F to charge the one or more power tools. The engaging means comprise the terminal blocks 14A-14F and the structure of the receivers 12A-12F engaging the terminal blocks. The terminal blocks 14A-14F may have any suitable construction in accordance with other embodiments, and, if included, the ribs 90A-90E may have any suitable construction and other locations in accordance with other embodiments. Similarly, the receivers 14A-14F may have any suitable construction in accordance with other embodiments, and, if included, the slots 80A-80E may have any suitable configuration and other locations in accordance with other embodiments. Such selective engagement means may be in any other suitable form in accordance with other embodiments of the present disclosure.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A kit comprising:
a plurality of power tools, each power tool configured to operate at an operating voltage, the operating voltages of at least two of the power tools being different from each other;
a plurality of receivers for charging the power tools, each receiver including a portable power source configured to provide an output charging voltage, the output charging voltages of at least two of the receivers being different from each other, the output charging voltage of one of the receivers being equal to or greater than the operating voltage of at least one of the power tools and the output charging voltage of an other of the receivers being equal to or greater than the operating voltage of at least one of the other power tools; and
means for selectively horizontally, slidably engaging each receiver with only one or more power tools having an operating voltage equal to or greater than the output charging voltage of the receiver to charge said one or more power tools and said horizontally, slidably selective engagement means includes a plurality of terminal blocks, each terminal block having at least one horizontally oriented rib and at least one of the receivers defines a horizontally oriented slot configured to engage a respective slot with a respective rib on the receivers and said one or more power tools having an operating voltage equal to or greater than the output charging voltage of the receiver, each terminal block is associated with a respective one of the power tools, wherein some of the terminal blocks include the rib and some of the receivers defines a slot configured to horizontally receive the rib of at least one of the terminal blocks, the location of the rib of each terminal block depending upon the output voltage of the respective power tool and the location of the slot of each receiver depending upon the output voltage of the receiver.

2. The kit of claim 1 wherein one of the terminal blocks does not include a rib receivable by any of the slots of the receivers.

3. The kit of claim 1 wherein one of the receivers does not define a slot configured to receive any of the ribs.

4. The kit of claim 1 wherein at least one of said some of the receivers defines a plurality of the slots, said at least one of said some of the receivers configured to alternatively engage two of the terminal blocks secured to respective power tools having output voltages greater than the output voltages of some of the receivers.

5. The kit of claim 1 wherein each power tool includes a housing having a base and each of the terminal blocks is secured to the base of the respective one of the power tools.

6. The kit of claim 1 wherein each of the power tools includes a power tool housing and each power tool housing is substantially similar in construction to each other.

7. The kit of claim 1 wherein each receiver includes a receiver housing and each receiver housing is substantially similar in construction to each other.

8. The kit of claim 1 wherein there are at least six power tools, the operating voltage of one of the power tools being 9.6 volts, the operating voltage of an other of the power tools being 12 volts, the operating voltage of an other of the power tools being 14.4 volts, the operating voltage of an other of the power tools being 18 volts, the operating voltage of an other of the power tools being 20 volts, and the operating voltage of an other of the power tools being 24 volts.

9. The kit of claim 1 wherein there are at least six receivers, the output charging voltage of one of the receivers being 9.6 volts, the output charging voltage of an other of the receivers being 12 volts, the output charging voltage of an other of the receivers being 14.4 volts, the output charging voltage of an other of the receivers being 18 volts, the output charging voltage of an other of the receivers being 20 volts, and the output charging voltage of an other of the receivers being 24 volts.

10. A kit comprising:
a plurality of power tools, each power tool configured to operate at an operating voltage, the operating voltages of at least two of the power tools being different from each other;
a plurality of receivers for charging the power tools, each receiver including a portable power source configured to provide an output charging voltage, the output charging voltages of at least two of the receivers being different from each other, the output charging voltage of one of the receivers being equal to or greater than the operating voltage of at least one of the power tools and the output charging voltage of an other of the receivers being equal to or greater than the operating voltage of at least one of the other power tools; and
a plurality of terminal blocks, each terminal block configured to selectively horizontally, slidably engage one of the receivers with only one or more power tools having an operating voltage equal to or greater than the output charging voltage of said one of the receivers to charge said one or more power tools.

11. The kit of claim 10 wherein each terminal block is secured to a respective one of the power tools.

12. The kit of claim 10 wherein some of the terminal blocks include a rib and some of the receivers define a slot configured to receive the rib of at least one terminal block to engage the terminal block.

13. The kit of claim 10 wherein some of the terminal blocks include a rib and some of the receivers define a slot configured to receive the rib of at least one of the terminal blocks, the location of the rib of each terminal block depending upon the output voltage of said one or more power tools and the location of the slot of each receiver depending upon the output voltage of said one of the receivers.

14. The kit of claim 13 wherein at least one of said some of the receivers defines a plurality of the slots, said at least one of said some of the receivers configured to alternatively engage two different terminal blocks secured to said one or more power tools having output voltages different than the output charging said at least one of said some of the receivers.

15. The kit of claim 10 wherein each of the power tools includes a power tool housing and each power tool housing is substantially similar in construction to each other, and each receiver includes a receiver housing and each receiver housing is substantially similar in construction to each other.

16. A kit comprising:
a plurality of power tools, each power tool configured to operate at an operating voltage, the operating voltages of at least two of the power tools being different from each other;
a plurality of receivers for charging the power tools, each receiver including a portable power source configured to provide an output charging voltage, the output charging voltages of at least two of the receivers being different from each other, the output charging voltage of one of the receivers being equal to or greater than the operating voltage of at least one of the power tools and the output charging voltage of an other of the receivers being equal to or greater than the operating voltage of at least one of the other power tools, at least some of the receivers defining a slot, the position of the slot of each of said some of the receivers depending upon the output charging voltage of the receiver; and
a plurality of terminal blocks, each terminal block horizontally, slidably secured to a respective power tool and at least some of the terminal blocks having a rib receivable by the slot of at least one of the receivers, the position of the rib of each of said some of the terminal blocks depending upon the operating voltage of the respective power tool, each terminal block configured to selectively engage one of the receivers with only one or more power tools having an operating voltage equal to or greater than the output charging voltage of said one of the receivers to charge said one or more power tools.

17. The kit of claim 16 wherein each of the power tools includes a power tool housing and each power tool housing is substantially similar in construction to each other, and each receiver includes a receiver housing and each receiver housing is substantially similar in construction to each other.

18. The kit of claim 17 wherein there are at least six power tools, the operating voltage of one of the power tools being 9.6 volts, the operating voltage of an other of the power tools being 12 volts, the operating voltage of an other of the power tools being 14.4 volts, the operating voltage of an other of the power tools being 18 volts, the operating voltage of an other of the power tools being 20 volts, and the operating voltage of an other of the power tools being 24 volts; and wherein there are at least six receivers, the output charging voltage of one of the receivers being 9.6 volts, the output charging voltage of an other of the receivers being 12 volts, the output charging voltage of an other of the receivers being 14.4 volts, the output charging voltage of an other of the receivers being 18 volts, the output charging voltage of an other of the receivers being 20 volts, and the output charging voltage of an other of the receivers being 24 volts.

* * * * *